(12) United States Patent
Iwaki et al.

(10) Patent No.: US 11,248,652 B2
(45) Date of Patent: Feb. 15, 2022

(54) SLIDING BEARING

(71) Applicant: TAIHO KOGYO CO., LTD., Toyota (JP)

(72) Inventors: Daisuke Iwaki, Toyota (JP); Shingo Iguchi, Toyota (JP)

(73) Assignee: TAIHO KOGYO CO., LTD.

( * ) Notice: Subject to any disclaimer, the term of this patent is extended or adjusted under 35 U.S.C. 154(b) by 0 days.

(21) Appl. No.: 16/652,752

(22) PCT Filed: Nov. 15, 2018

(86) PCT No.: PCT/JP2018/042307
§ 371 (c)(1),
(2) Date: Apr. 1, 2020

(87) PCT Pub. No.: WO2019/098281
PCT Pub. Date: May 23, 2019

(65) Prior Publication Data
US 2020/0232507 A1    Jul. 23, 2020

(30) Foreign Application Priority Data
Nov. 17, 2017 (JP) .............................. JP2017-221663

(51) Int. Cl.
*F16C 17/02* (2006.01)
*F16C 33/04* (2006.01)
(Continued)

(52) U.S. Cl.
CPC .............. *F16C 33/046* (2013.01); *F16C 9/02* (2013.01); *F16C 17/02* (2013.01); *F16C 17/10* (2013.01); *F16C 2226/76* (2013.01)

(58) Field of Classification Search
CPC .......... F16C 9/02; F16C 17/10; F16C 33/046; F16C 43/02; F16C 2226/74; F16C 2226/76; F16C 2360/22
See application file for complete search history.

(56) References Cited

U.S. PATENT DOCUMENTS 4,533,261 A * 8/1985 Losio .................. F16C 17/10
384/129
5,267,797 A 12/1993 Brandt
(Continued)

FOREIGN PATENT DOCUMENTS

CN      1902406 A    1/2007
CN    101835995 A    9/2010
(Continued)

OTHER PUBLICATIONS

Office Action issued by the German Patent and Trademark Office for Application No. DE112018004672, dated Oct. 9, 2020 (12 pages).
(Continued)

*Primary Examiner* — Alan B Waits
(74) *Attorney, Agent, or Firm* — Harness, Dickey & Pierce, P.L.C.

(57) ABSTRACT

A half bearing has a concave portion, a concave portion, and a concave portion penetrating from the outer circumferential surface to the inner circumferential surface, and the washer has a convex portion, a convex portion, and a convex portion on the inner circumferential surface side. The washer is moved to the outer circumferential surface side of the half bearing in a bent state, the convex portion is inserted into the concave portion, the convex portion is aligned with the position of the concave portion, and the convex portion is aligned with the position of the convex portion. Next, when the half bearing returns to its shape before being bent, the convex portion is accommodated in the concave portion, and the convex portion is also accommodated in the concave portion. Even if an axial force acts on the sliding bearing, the protrusion, the protrusion, and the protrusion engages with the concave portion, the concave portion, and the concave portion, so that the washer and the washer are not detached from the half bearing.

1 Claim, 6 Drawing Sheets

(51) Int. Cl.
*F16C 9/02* (2006.01)
*F16C 17/10* (2006.01)

(56) References Cited

U.S. PATENT DOCUMENTS

| | | | |
|---|---|---|---|
| 5,520,466 A | 5/1996 | Everitt et al. | |
| 6,227,709 B1 | 5/2001 | Lehmann et al. | |
| 6,471,405 B1 | 10/2002 | Bickle et al. | |
| 8,449,193 B2 * | 5/2013 | Kuwabara | F16C 43/02 384/420 |
| 9,726,219 B2 * | 8/2017 | Gallas | F16C 33/046 |
| 10,082,173 B2 | 9/2018 | Jones et al. | |
| 10,677,283 B2 * | 6/2020 | Buschenhenke | F16C 9/02 |
| 10,718,373 B2 * | 7/2020 | Jost | F16C 17/10 |
| 2010/0215300 A1 | 8/2010 | Schlabs | |
| 2012/0243815 A1 * | 9/2012 | Kuwabara | F16C 17/10 384/420 |
| 2014/0314356 A1 * | 10/2014 | Patel | F16C 17/10 384/420 |
| 2016/0160908 A1 * | 6/2016 | Gallas | F16C 17/10 384/368 |
| 2017/0051782 A1 * | 2/2017 | Jones | F16C 43/02 |

FOREIGN PATENT DOCUMENTS

| | | |
|---|---|---|
| DE | 4140277 A1 | 7/1992 |
| DE | 4225000 C1 | 11/1993 |
| DE | 10-2011-085647 A1 | 5/2013 |
| EP | 0962671 A2 | 12/1999 |
| JP | S51-124756 A | 10/1976 |
| JP | S64-38322 U | 3/1989 |
| JP | H05-503763 A | 6/1993 |
| JP | H07-502327 A | 3/1995 |
| JP | 2003-500616 A | 1/2003 |
| JP | 2010-539403 A | 12/2010 |
| JP | 2012-202488 A | 10/2012 |
| JP | 2015-200381 A | 11/2015 |
| JP | 2016-529450 A | 9/2016 |
| JP | 2017-040365 A | 2/2017 |
| JP | 6110332 B2 | 4/2017 |

OTHER PUBLICATIONS

Chinese Office Action for corresponding Application No. 201880066877.7 dated Jan. 5, 2021 with English translation (16 Pages).
Chinese Office Action for corresponding Chinese Application No. 201880066877.7 dated Aug. 13, 2021 (total 13 pages).
Japanese Office Action issued for corresponding Japanese Patent Application No. 2017-221663; dated Oct. 22, 2021 (total 6 pages).

* cited by examiner

SLIDING BEARING

CROSS REFERENCE TO RELATED APPLICATIONS

This application is a U.S. National Stage Application of International Application No. PCT/JP2018/042307, filed on Nov. 15, 2018, which claims priority to Japanese Application No. 2017-221663, filed on Nov. 17, 2017. The entire disclosures of the above applications are incorporated herein by reference.

TECHNICAL FIELD

The present invention relates to a sliding bearing.

RELATED ART

In an internal combustion engine, a slide bearing consisting of two half bearings is used to rotatably support a crankshaft. The two half bearings are arranged vertically and a washer is attached to each of the two half bearings. In such a sliding bearing, the half bearing is subject to a load in a direction perpendicular to the axial direction of the crankshaft, and the washer is subject to an axial load. As a method of attaching the washer to the half bearing, for example, JP-A-2015-200381 discloses a method of calking (or staking) a convex portion of the washer into a concave portion of the half bearing and calking the periphery of the concave portion.

In the method disclosed in JP-A-2015-200381, the periphery of the concave portion is calked after a plurality of convex portions is fitted into respective plurality of concave portions during manufacture. However, a calking force and position may vary from workpiece to workpiece. If variance in calking properties occurs, a force at which calking is applied to fix the convex portion is likely to vary depending on a position of the workpiece. Thus, a possibility exists that a washer may become detached from the half bearing before the half bearing is assembled in the cylinder block.

The present invention provides a technique to prevent disengagement of a washer mounted on a half bearing.

SUMMARY

The present invention provides a sliding bearing including: a half bearing having an inner peripheral surface including an outer peripheral surface supported by a housing, and a sliding surface slidable with a mating shaft; a washer attached to the outer peripheral surface, wherein the washer has a first convex portion and a second convex portion on a surface facing the outer peripheral surface, the half bearing has a first concave portion into which the first convex portion is inserted from the outer peripheral surface side, and a second concave portion into which the second convex portion is inserted from the outer peripheral surface side, when a force in the axial direction of the mating shaft acts on the washer, the first convex portion engages with the first concave portion and the second convex portion engages with to the second concave portion, the first convex portion and the second convex portion have no calking trace, and no calking traces exist around the first concave portion and the second concave portion.

The first convex portion may be located between a first imaginary line connecting the center of the inner circumferential surface of the washer and a first end of the inner circumferential surface of the washer in the circumferential direction, and a second imaginary line extending from the center in the direction of the inner circumferential surface of the washer at an angle of 30 degrees to the first imaginary line, and the second convex portion may be located between a third imaginary line connecting the center of the inner peripheral surface of the washer and the second end of the inner peripheral surface of the washer in the circumferential direction, and a fourth imaginary line extending from the center in the direction of the inner peripheral surface at an angle of 30 degrees to the third imaginary line.

The washer may have a first notch on the inner circumferential surface side of the first end and a second notch on the inner circumferential surface side of the second end, the distance from the first imaginary line to the end on the inner circumferential surface side of the first notch may be longer than the distance from the end on the inner circumferential surface side of the first notch to the first convex portion, and the distance from the second imaginary line to the end on the inner circumferential surface side of the second notch may be longer than the distance from the end on the inner circumferential surface side of the second notch to the second convex portion.

The first concave portion and the second concave portion are configured to not open to axial ends.

Advantageous Effect

The present invention enables a sliding bearing to prevent the washer attached to the half bearing from becoming detached.

DETAILED DESCRIPTION

Embodiments

Figure 1:
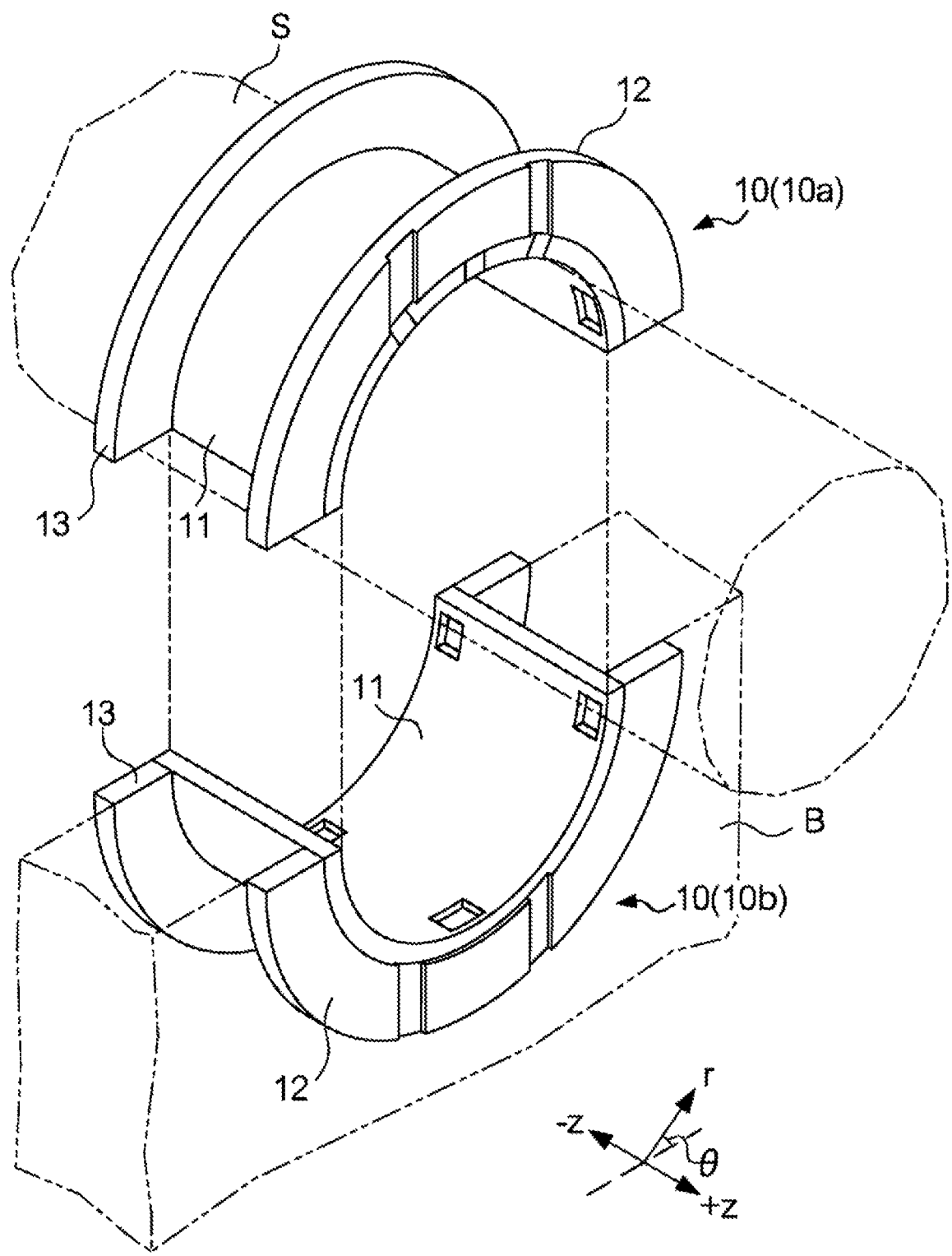
FIG. 1 shows an exemplary sliding bearing 10 according to an embodiment of the present invention.

FIG. 1 shows an exemplary sliding bearing 10 according to an embodiment of the present invention. The sliding bearing 10 is an example of a sliding bearing that supports a crankshaft S in a cylinder block B of an engine of a vehicle, for example. The crankshaft S is a cylindrical shaft and rotates relative to the sliding bearing 10. The crankshaft S is an example of a mating shaft with respect to the sliding bearing 10.

The sliding bearing 10 includes a half bearing 11, a washer 12, and a washer 13. The half bearing 11 is in the shape of a half cylinder obtained by dividing a cylinder in two along its axial direction. The inner peripheral surface of the half bearing 11 slides with the outer peripheral surface of the crankshaft S. The half bearing 11 is a main bearing that receives a load perpendicular to the axial direction. The washer 12 and the washer 13 are in the shape of a semicircular ring in which an annular shape is divided in two along its diameter. The washer 12 and the washer 13 are thrust bearings (or thrust washers) that receive axial loads (or thrust loads) from the crankshaft S. The shapes of the washer 12 and the washer 13 are not limited to a shape of a semicircular ring, and may be arc-shaped with a length in the circumferential direction that is shorter than the semicircular ring.

The sliding bearing 10 supports half of the outer circumference of the crankshaft S in the circumferential direction. That is, in order to support the crankshaft S over its entire circumference, two sliding bearings 10 are used for each position where the sliding bearings 10 are arranged in the cylinder block B. In the example of FIG. 1, two bearings are shown; a sliding bearing 10a that supports the upper half of the outer circumference of the crankshaft S, and a sliding bearing 10b that supports the lower half of the outer circumference of the crankshaft S. It is of note that the sliding bearing 10a and the sliding bearing 10b need not necessarily be used in pairs, and a single one may be used. When a pair each of the sliding bearing 10a and the sliding bearing 10b are used, the sliding bearing 10a and the sliding bearing 10b need not necessarily be provided with washers. A washer may be provided only at one end in the axial direction of either one of the sliding bearing 10a and the sliding bearing 10b, or only at one end in the axial direction of both the sliding bearing 10a and the sliding bearing 10b.

To aid description, a coordinate system will now be defined. In this coordinate system, the axial direction of the mating axis (crankshaft S) is defined as the z direction, and the positions of the circumferential direction and the radial direction of the axis are represented by a polar coordinate system (r, θ). θ represents a displacement angle from a reference plane, e.g., a horizontal plane, and r represents a distance from a reference point.

The half bearing 11 has a multilayer structure consisting of, for example, a backing metal, a lining layer, and an overlay layer from an outer peripheral surface side serving as an outer surface of a semicylindrical shape toward an inner peripheral surface side (or sliding surface) supporting the crankshaft S. The backing metal is a layer that provides mechanical strength to the half bearing 11. The backing metal may be made of, for example, steel.

The lining layer is a layer for improving bearing characteristics, such as friction (coefficient), seizure resistance, wear resistance, conformability, foreign matter robustness, and corrosion resistance. The lining layer is made of a bearing alloy. For the lining layer, a material system different to that of the shaft is used so as to prevent adhesion between the bearing and the shaft. For example, when the crankshaft S is made of steel, the bearing is made of an alloy such as an aluminum alloy. In addition to the aluminum alloy, an alloy other than aluminum alloy, for example, a copper alloy, may be used.

The overlay layer forms an inner peripheral surface for supporting the crankshaft S, and improves characteristics of the lining layer such as friction coefficient, conformability, corrosion resistance, and foreign matter robustness. The overlay layer includes, for example, at least a binder resin. As the binder resin, for example, a thermosetting resin is used. Specifically, the binder resin includes at least one of polyamide-imide (PAI) resin, polyimide (PI) resin, polyamide resin, phenolic resin, polyacetal resin, polyetherate ketone resin, and polyphenylene sulfide resin. The overlay layer may further comprise a solid lubricant. The solid lubricants are added to improve frictional properties. The solid lubricants include, for example, at least one of $MoS_2$, $WS_2$, polytetrafluoroethylene (PTFE), graphite, h-BN, and $SB_2O_3$. For example, $MoS_2$ provides good lubricity. In addition, since PTFE has a low intermolecular cohesion, it is effective in reducing frictional coefficients. In addition, graphite improves wettability and initial conformability. Initial familiarity is a property whereby a sliding surface becomes worn and smooth when sliding contact is made with the mating member after start of sliding, thereby improving sliding properties. When slidability is improved as a result of initial familiarity, a wear amount of the entire sliding layer is reduced. In the present embodiment, the half bearing 11 includes an overlay layer, but may have a two-layer structure including a backing metal and a lining layer without an overlay layer. In addition, the overlay layer may be provided on only one of the sliding bearing 10a and the sliding bearing 10b.

The washer 12 and the washer 13 are made of the same material as that of the half bearing 11. The washer 12 and the washer 13 are manufactured separately from the half bearing 11 and then attached to the half bearing 11. The washer 12 and the washer 13 may be made of a material different from that of the half bearing 11, or may have different thicknesses.

Figure 2:
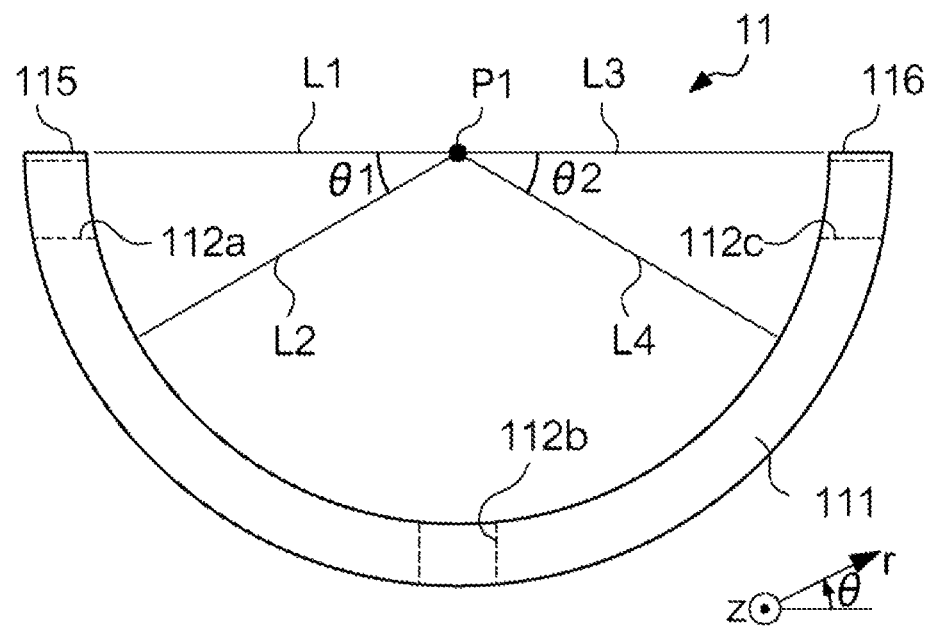
FIG. 2 shows a front view of a half bearing 11.
Figure 3:
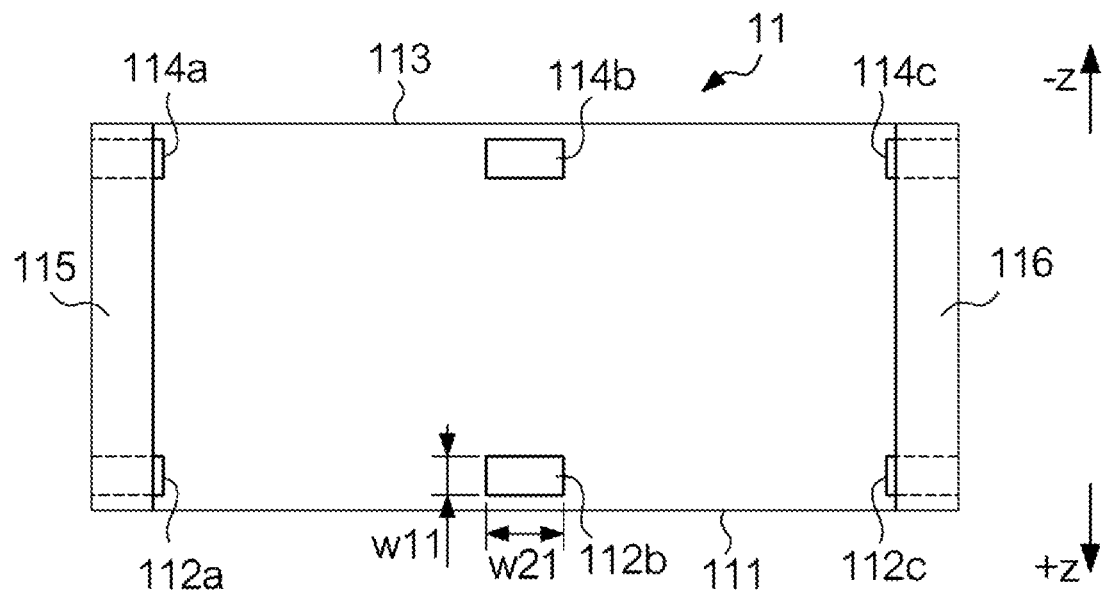
FIG. 3 shows a plan view of the half bearing 11.
Figure 4:
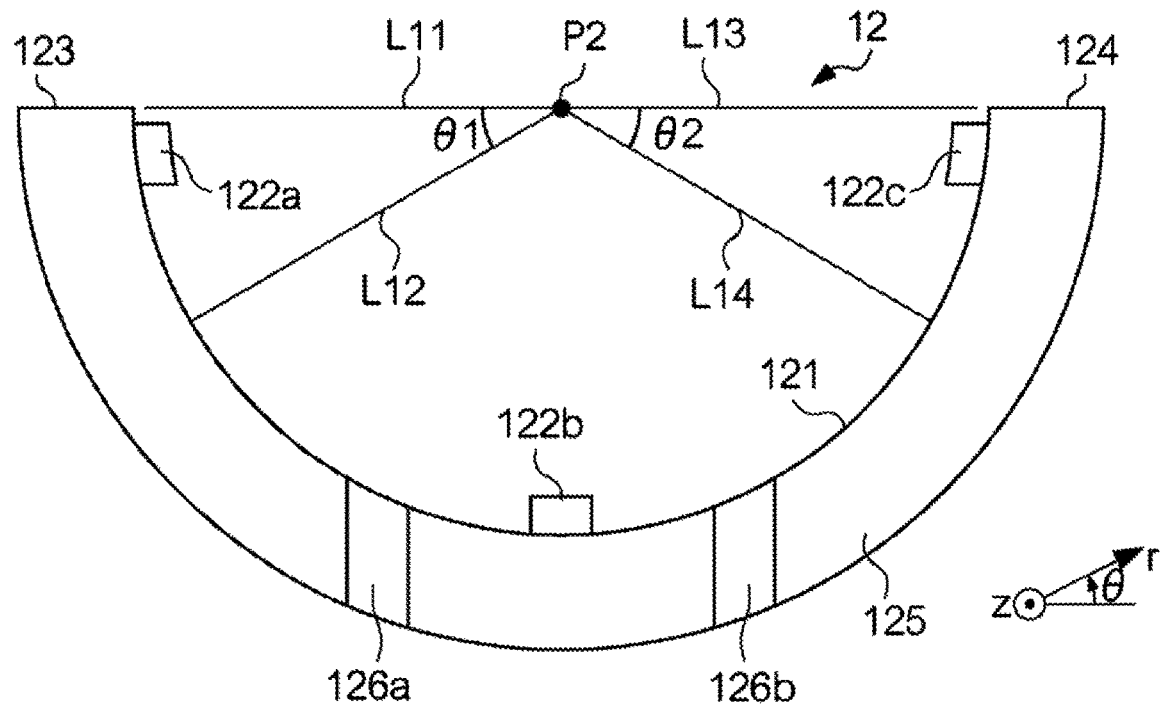
FIG. 4 shows a front view of a washer 12.
Figure 5:
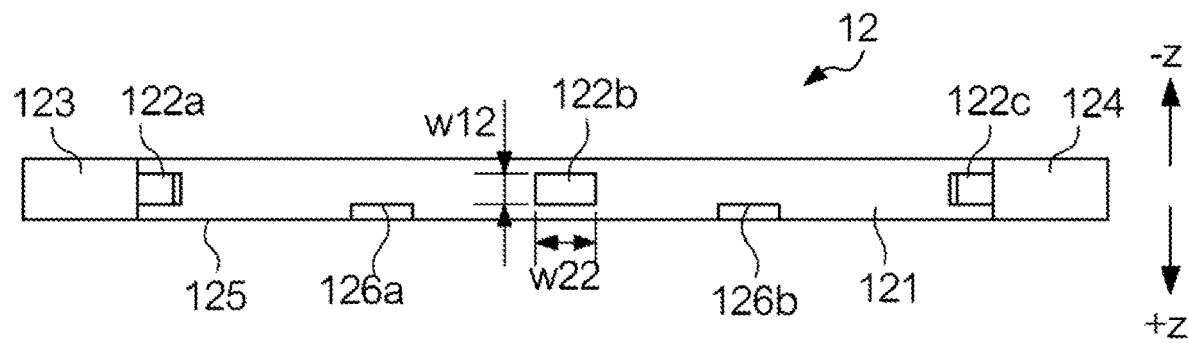
FIG. 5 shows a plan view of the washer 12.
Figure 6:
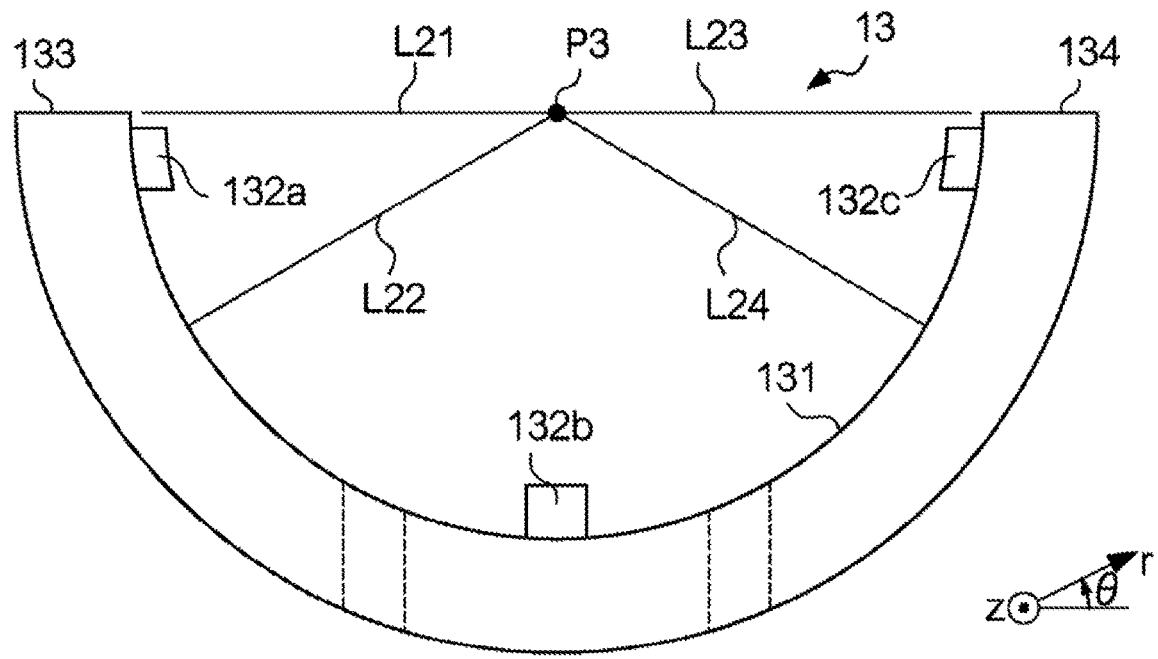
FIG. 6 shows a front view of a washer 13.
Figure 7:
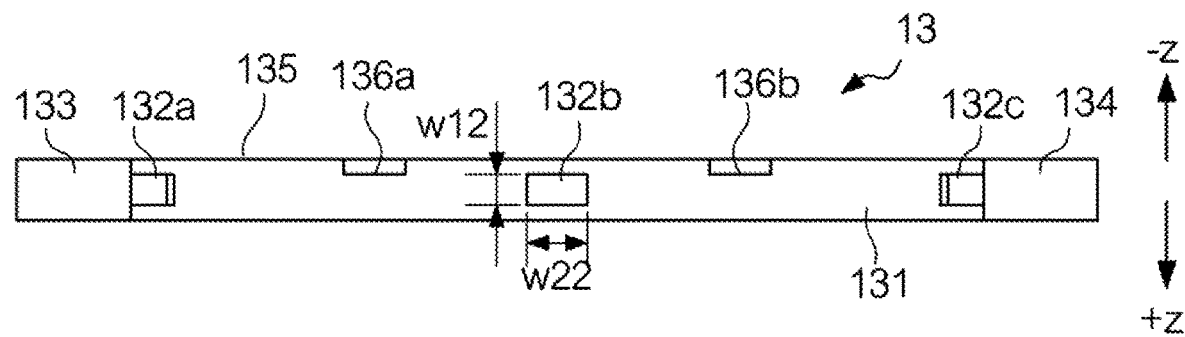
FIG. 7 shows a plan view of the washer 13.

FIG. 2 shows a front view of the half bearing 11, and FIG. 3 shows a plan view of the half bearing 11. FIG. 4 shows a front view of the washer 12, FIG. 5 shows a plan view of the washer 12, FIG. 6 shows a front view of the washer 13, and FIG. 7 shows a plan view of the washer 13.

The half bearing 11 has a mating surface 115 and a mating surface 116 in contact with the other half bearing 11. In the half bearing 11, a concave portion 112a (first concave portion), a concave portion 112b, and a concave portion 112c (second concave portion) for attaching the washer 12 are formed within a predetermined range from the end surface 111 on the +z direction side toward the −z direction side. The concave portion 112a, the concave portion 112b, and the concave portion 112c are each positioned at the same distance from the end surface 111. The concave portion 112a, the concave portion 112b, and the concave portion 112c each have holes penetrating from the inner circumferential surface side to the outer circumferential surface side of the half bearing 11, and are rectangular in shape when the half bearing 11 is viewed in the radial direction. The concave portions 112a, 112b, and 112c have a width w11 in the axial direction and a width w21 in the circumferential direction. When the half bearing 11 is viewed in the axial direction, the concave portion 112a is within a range between an imaginary line L1 connecting the center point P1 of the inner circumferential surface of the half bearing 11 and the matching surface 115, and an imaginary line L2 having an angle of θ1 counterclockwise about the center point P1 of the inner circumferential surface from the imaginary line L1. When the half bearing 11 is viewed in the axial direction, the concave portion 112c is within a range between an imaginary line L3 connecting the center point P1 of the inner circumferential surface of the half bearing 11 and the matching surface 116, and an imaginary line L4 having an angle of θ2 clockwise about the center point P1 of the inner circumferential surface from the imaginary line L3. In the present embodiment, either θ1 or θ2 are 30 degrees. When the half bearing 11 is viewed in the axial direction, the concave portion 112b includes the position of the midpoint in the circumferential direction of the inner peripheral surface of the half bearing 11.

In the half bearing 11, a concave portion 114a (or first concave portion), a concave portion 114b, and a concave portion 114c (or second concave portion) for attaching the washer 13 are formed within a predetermined range from the end surface 113 on the −z direction side toward the +z direction side. The concave portion 114a, the concave portion 114b, and the concave portion 114c are each positioned at the same distance from the end surface 113. The concave portion 114a, the concave portion 114b, and the concave portion 114c each have holes penetrating from the inner circumferential surface side to the outer circumferential surface side of the half bearing 11, and are rectangular in shape when the half bearing 11 is viewed in the radial direction. The concave portions 114a, 114b, and 114c have a width w11 in the axial direction and a width w21 in the circumferential direction. The concave portion 114a is within a range between the imaginary line L1 and the imaginary line L2 when the half bearing 11 is viewed in the axial direction. The concave portion 114c is within a range between the imaginary line L3 and the imaginary line L4 when the half bearing 11 is viewed in the axial direction. When the half bearing 11 is viewed in the axial direction, the concave portion 114b includes the position of the midpoint in the circumferential direction of the inner peripheral surface of the half bearing 11.

The width in the circumferential direction and the width in the axial direction of the concave portion 112a, the concave portion 112b, and the concave portion 112c are the same, and thus in the following description the term concave portions 112 is used unless there is a need to distinguish the concave portions from each other. In addition, since the width in the circumferential direction and the width in the axial direction are the same for the concave portion 114a, the concave portion 114b, and the concave portion 114c, each, in the following description, the term concave portions 114 is used unless there is a need to distinguish the concave portions from each other.

The washer 12 has a mating surface 123 and a mating surface 124 facing the washer of the other sliding bearing 10. A convex portion 122a (or a first convex portion), a convex portion 122b, and a convex portion 122c (or a second convex portion) for attaching the washer 12 to the half bearing 11 are formed on the inner peripheral surface 121 of the inner side in the radial direction of the washer 12. The convex portion 122a, the convex portion 122b, and the convex portion 122c project radially from the inner peripheral surface 121 of the washer 12, and are rectangular in shape when the washer 12 is viewed in the radial direction. The convex portions 122a, 122b, and 122c have a width w12 in the axial direction and a width w22 in the circumferential direction. In the present embodiment, w11>w12 and w21>w22 are satisfied. The convex portion 122a, the convex portion 122b, and the convex portion 122c are each positioned at the same distance from the thrust surface 125, which is an end surface in the axial direction. The convex portion 122a is within a range between an imaginary line L11 (or a first imaginary line) connecting the center point P2 of the inner peripheral surface 121 of the washer 12 and the matching surface 123 (or a first end) when the washer 12 is viewed in the axial direction, and an imaginary line L12 (or a second imaginary line) having an angle of θ1 counterclockwise about the center point P2 of the inner peripheral surface 121 from the imaginary line L11. When the washer 12 is viewed in the axial direction, the convex portion 122c is within a range between an imaginary line L13 (or a third imaginary line) connecting the center point P2 of the inner peripheral surface 121 of the washer 12 and the matching surface 124 (or a second end) and an imaginary line L14 (or a fourth imaginary line) having an angle of θ2 clockwise about the center point P2 of the inner peripheral surface 121 from the imaginary line L13. The convex portion 122b includes the position of the midpoint in the circumferential direction of the inner peripheral surface and the outer peripheral surface of the washer 12 when the washer 12 is viewed in the axial direction. An oil groove 126a and an oil groove 126b are provided in a thrust surface 125 that receives a thrust load in the washer 12. The oil groove 126a and the oil groove 126b serve as an oil supply path for holding the lubricating oil and receiving the lubricating oil supplied from the half bearing 11. Since the convex portions 122a, 122b, and 122c have the same width in the circumferential direction and the same width in the axial direction, in the following description, the term convex portions 122 is used unless there is a need to distinguish the convex portions from each other.

The washer 13 has a mating surface 133 and a mating surface 134 facing the washer of the other sliding bearing 10. A convex portion 132a (or a first convex portion), a convex portion 132b, and a convex portion 132c (or a second convex portion) for attaching the washer 13 to the half bearing 11 are provided on the inner peripheral surface 131 of the inner side in the radial direction of the washer 13. The convex portions 132a, 132b, and 132c project radially from the inner peripheral surface 131 of the washer 13, and are rectangular in shape when the washer 13 is viewed in the radial direction. The convex portions 132a, 132b, and 132c have a width w12 in the axial direction and a width w22 in the circumferential direction. The convex portion 132a, the convex portion 132b, and the convex portion 132c are positioned to have the same distance from the thrust surface 135, which is an end surface in the axial direction. The convex portion 132a is within a range between an imaginary line L21 (or a first imaginary line) connecting the center point P3 of the inner peripheral surface 131 of the washer 13 and the matching surface 133 when the washer 13 is viewed in the axial direction, and an imaginary line L22 (or a second imaginary line) having an angle of θ1 counterclockwise about the center point P3 of the inner peripheral surface 131 from the imaginary line L21. When the washer 13 is viewed in the axial direction, the convex portion 132c is within a range between an imaginary line L23 (or a third imaginary line) connecting the center point P3 of the inner peripheral surface 131 of the washer 13 and the matching surface 134, and an imaginary line L24 (or a fourth imaginary line) having an angle of θ2 clockwise about the center point P3 of the inner peripheral surface 131 from the imaginary line L23. The convex portion 132b includes the position of the midpoint in the circumferential direction of the inner peripheral surface and the outer peripheral surface of the washer 13 when the washer 13 is viewed in the axial direction. An oil groove 136a and an oil groove 136b are provided in a thrust surface 135 that receives a thrust load in the washer 13. The oil groove 136a and the oil groove 136b serve as an oil supply path for holding the lubricating oil and receiving the lubricating oil supplied from the half bearing 11. Since the width and the axial direction of the circumferential direction are the same for the convex portion 132a, the convex portion 132b and the convex portion 132c, in the following description, the term convex portion 132 is used unless it is necessary to distinguish the convex portions from each other.

Figure 8:
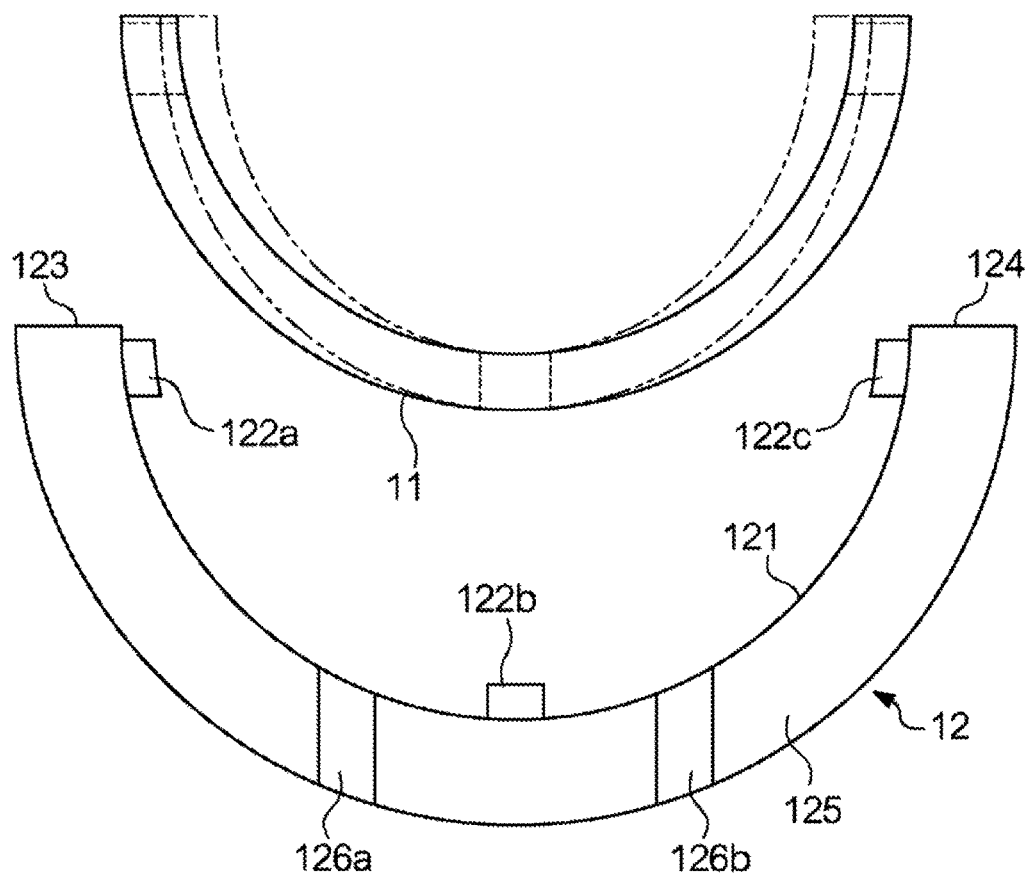
FIG. 8 shows an explanatory view for a method of mounting the washer 12 and the washer 13 to the half bearing 11.
Figure 9:
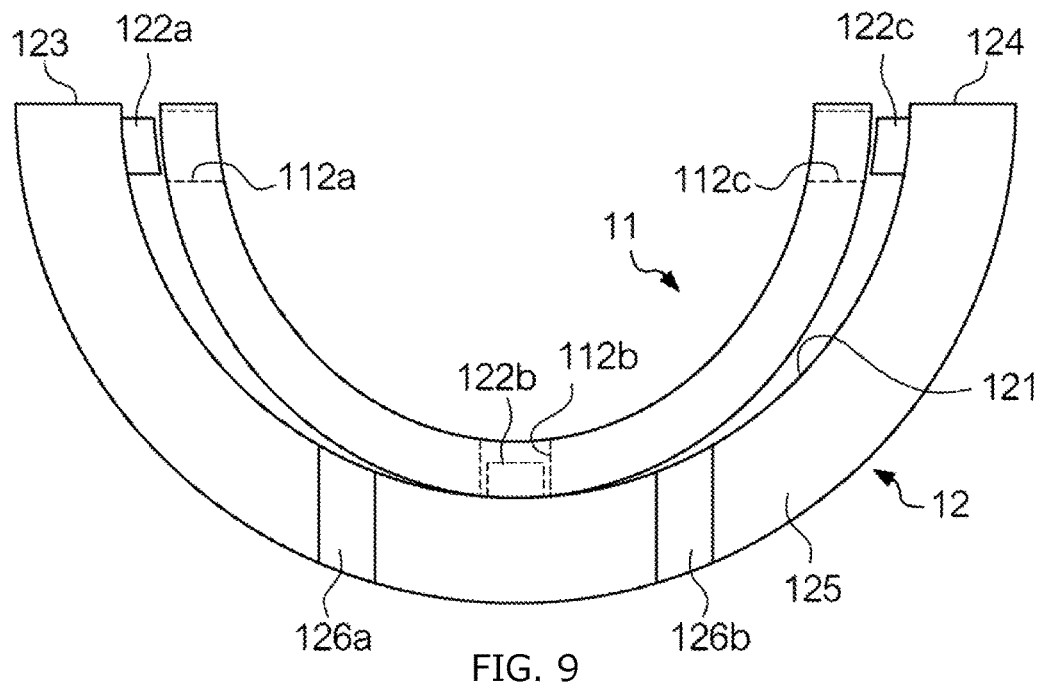
FIG. 9 shows an explanatory view for a method of mounting the washer 12 and the washer 13 to the half bearing 11.

Next, a method of attaching the washer 12 and the washer 13 to the half bearing 11 will be described. First, a force is applied in the radial direction to an end portion of the outer circumferential surface of the half bearing 11 in the circumferential direction, and the half bearing 11 is bent toward the inner circumferential surface as indicated by a broken line in FIG. 8. Next, as shown in FIG. 9, the washer 12 is moved to the outer peripheral surface side of the half bearing 11 in the bent state, and the convex portion 122b is inserted into the concave portion 112b. Further, the convex portion 122a is aligned with the position of the concave portion 112a, and the convex portion 122c is aligned with the position of the concave portion 112c. Similarly to the washer 12, the washer 13 is moved to the outer peripheral surface side of the half bearing 11 in the bent state, and the convex portion 132b is inserted into the concave portion 114b. Further, the convex portion 132a is aligned with the position of the concave portion 114a, and the convex portion 132c is aligned with the position of the concave portion 114c.

Figure 10:
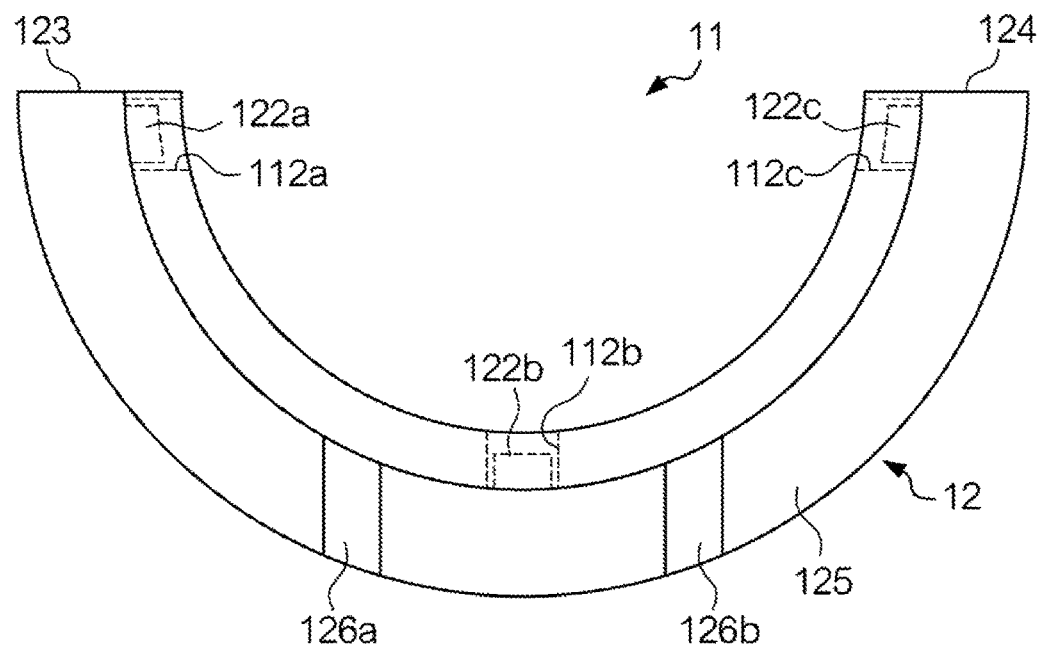
FIG. 10 shows an explanatory view for explaining a method of mounting the washer 12 and the washer 13 to the half bearing 11.

Next, the force applied to the circumferential end portion of the half bearing 11 is removed, and the half bearing 11 returns to the state before being bent. When the half bearing 11 returns to the state before being bent, as shown in FIG. 10, the convex portion 122a does not project from the concave portion 112a to the inner peripheral surface side of the half bearing 11, but fits in the concave portion 112a, and the convex portion 122b also fits in the concave portion 112b without projecting from the concave portion 112b to the inner peripheral surface side of the half bearing 11. The convex portion 122c also fits within the concave portion 112c without protruding from the concave portion 112c toward the inner peripheral surface side of the half bearing 11. When the washer 13 returns to the state before the half bearing 11 is bent, the convex portion 132a does not project from the concave portion 114a to the inner peripheral surface side of the half bearing 11 but fits in the concave portion 114a, and the convex portion 132b also fits in the concave portion 114b without projecting from the concave portion 114b to the inner peripheral surface side of the half bearing 11. The convex portion 132c also fits within the concave portion 114c without protruding from the concave portion 114c toward the inner peripheral surface side of the half bearing 11.

According to the sliding bearing 10 of the present embodiment, since calking is not performed, there is no calking trace, the convex portion 122 is accommodated in the concave portion 112, and the convex portion 132 is accommodated in the concave portion 114, and when an axial force acts on the sliding bearing 10, the convex portion 122 engages with the concave portion 112, and the convex portion 132 engages with the concave portion 114, so that the washer 12 and the washer 13 are not detached from the half bearing 11. Further, even if a force in the extension direction of any of the convex portions 122a, 122b, and 122c acts on the washer 12, any other convex portion engages with the concave portion, and therefore, the washer 12 is not detached from the half bearing 11 because any other convex portion engages with the concave portion even if a force in the extension direction of any of the convex portion 132a, 132b, and 132c acts on the washer 13, any other convex portion engages with the concave portion, and therefore, the washer 13 is not detached from the half bearing 11. Further, according to the sliding bearing 10 of the present embodiment, as compared with a case of assembling the washer to the half bearing by calking, no calking portion exists upon attaching the washer 12 and the washer 13 to the half bearing 11, with a result that a work process is more efficient, and attachment is facilitated.

Modification

The present invention is not limited to the description in the foregoing embodiments, and can be implemented by way of various other modifications. For example, the invention described in the foregoing embodiments may be modified and implemented as set out below. Any items in the above-described embodiments and the following modified examples may be combined, as appropriate.

In the embodiment described above, the concave portion 112 and the concave portion 114 penetrate from the outer circumferential surface side to the inner circumferential surface side of the half bearing 11. However, a configuration may be adopted such that the concave portion 112 and the concave portion 114 do not penetrate to the inner circumferential surface side.

In the present invention, the convex portions 122a and 122c and the convex portion 122b may have different heights in the radial direction from the inner peripheral surface of the washer 12. For example, a configuration may be adopted such that a height of the convex portion 122a and the convex portion 122c in the radial direction from the inner peripheral surface of the washer 12 is lower than that of the convex portion 122b. According to this configuration, when the washer 12 is attached to the half bearing 11, the amount of deflection of the half bearing 11 can be reduced. The convex portions 132a and 132c and the convex portion 132b may have different heights in the radial direction from the inner peripheral surface of the washer 13.

The shape and number of the concave portions in the half bearing 11 and the shape and number of the convex portions in the washer 12 and the washer 13 are not limited to those described in the embodiment, and may be of other shapes and numbers. Also, the positions of the concave portion and the convex portion are not limited to the positions illustrated in the embodiment, and may have other positions.

The washer 12 and the washer 13 may have a detent protrusion on the outer peripheral surface to prevent rotation relative to the cylinder block B. The shape and number of the oil grooves 126 and the shape and number of the oil grooves 136 are not limited to those described in the embodiment, and may be of other shapes and numbers.

In the embodiment described above, the washer 12 and the washer 13 are attached to the half bearing 11, but only one of the washer 12 and the washer 13 may be attached to the half bearing 11.

In the embodiment described above, two identical sliding bearings 10 are used to support the mating shaft, but the two sliding bearings 10 used herein may have different shapes, for example, they may have inner circumferential surfaces. For example, an oil groove or an oil hole may be provided on the sliding surface of one of the upper side and the lower side of the sliding bearing 10. Application of the sliding bearing 10 is not limited to supporting the crankshaft S.

In the embodiment described above, the convex portion 122 is rectangular in shape when the washer 12 is viewed in the radial direction, but may have another shape, such as a polygon, a circle, or an ellipse as long as the convex portion 122 engages with the concave portion 112. The convex portion 132 is also rectangular in shape when the washer 13 is viewed in the radial direction, but may have another shape, such as a polygon, a circle, or an ellipse as long as the convex portion 132 engages with the concave portion 114.

In the embodiment described above, the concave portion 112 is configured so as not to open to the end surface 111.

However, a groove may be provided that extends from the end surface 111 to the concave portion 112, with a width that is narrower than the width w22 of the convex portion 122 in the circumferential direction; and by way of this groove the concave portion 112 may be configured to open to the end surface 111. Further, although the concave portion 112 is configured not to open to the end surface 111, a groove may be provided that extends from the end surface 113 to the concave portion 114, with a width that is narrower than the width w22 of the convex portion 132 in the circumferential direction, and the concave portion 114 may be configured to be opened to the end surface 113 by this groove.

Figure 11:
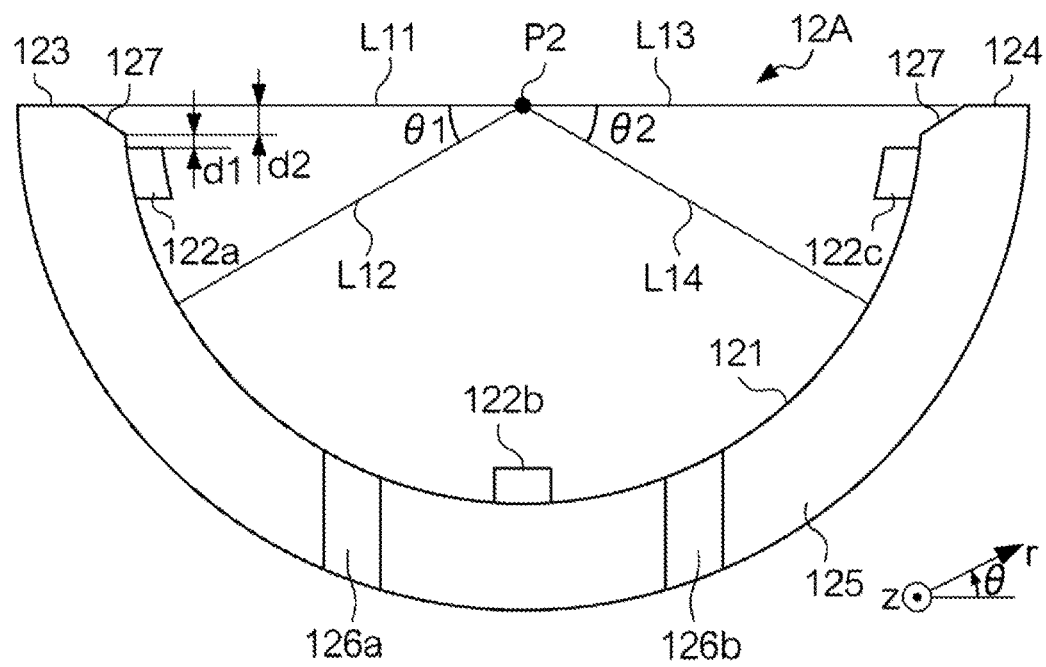
FIG. 11 shows a front view of a washer 12A according to a modification.

In the present invention, the washer may be configured to have a notch 127 on the inner peripheral surface 121 side of the end in the circumferential direction, as in the washer 12A shown in FIG. 11. The notch 127 adjacent to the matching surface 123 is an example of the first notch according to the present invention, and the notch 127 adjacent to the matching surface 124 is an example of the second notch according to the present invention. Further, in the configuration in which the washer has the notch 127 as in the washer 12A, the relationship between the distance d2 from the imaginary line drawn in the horizontal direction from the end of the notch 127 on the inner peripheral surface 121 side to the imaginary line L1 and the distance d1 from the imaginary line drawn in the horizontal direction from the end of the notch 127 on the inner peripheral surface side to the imaginary line drawn in the horizontal direction to the end of the convex portion 122a (convex portion 122c) on the notch 127 side to the imaginary line drawn in the horizontal direction may be such that d2>d1. The washer 13 may have the same configuration as the washer 12A shown in FIG. 11.

In the present invention, the washer 12 may not have the convex portion 122b, and the washer 13 may not have the convex portion 132b. Further, in the configuration in which the washer 12 does not have the convex portion 122b and the washer 13 does not have the convex portion 132b, the half bearing 11 may have a configuration in which the concave portion 112b and the concave portion 114b are not provided.

The invention claimed is:

1. A sliding bearing comprising:
   a half bearing having:
      a first axial end surface;
      a second axial end surface opposite the first axial surface in an axial direction of the half bearing; and
      an inner peripheral surface and an outer peripheral surface extending between the first and second axial surfaces, the outer peripheral surface being supported by a housing, the inner peripheral surface being slidable with a mating shaft; and
   a washer attached to the outer peripheral surface, wherein
   the washer has a first convex portion and a second convex portion on a surface facing the outer peripheral surface,
   the half bearing has a first concave portion into which the first convex portion is inserted from the outer peripheral surface side, and a second concave portion into which the second convex portion is inserted from the outer peripheral surface side,
   when a force in the axial direction of the mating shaft acts on the washer, the first convex portion engages with the first concave portion and the second convex portion engages with to the second concave portion,
   the first convex portion and the second convex portion have no calking trace,
   no calking traces exist around the first concave portion and the second concave portion,
   the first concave portion is not open to either the first axial end surface or the second axial end surface,
   the second concave portion is not open to either the first axial end surface or the second axial end surface,
   the first convex portion is located between a first imaginary line connecting the center of the inner circumferential surface of the washer and a first end of the inner circumferential surface of the washer in the circumferential direction, and a second imaginary line extending from the center in the direction of the inner circumferential surface of the washer at an angle of 30 degrees to the first imaginary line,
   the second convex portion is located between a third imaginary line connecting the center of the inner peripheral surface of the washer and a second end of the inner peripheral surface of the washer in the circumferential direction, and a fourth imaginary line extending from the center in the direction of the inner peripheral surface at an angle of 30 degrees to the third imaginary line,
   the washer has a first notch on the inner circumferential surface side of the first end and a second notch on the inner circumferential surface side of the second end,
   the distance from the first imaginary line to the end of the inner circumferential surface side of the first notch is longer than the distance from the end on the inner circumferential surface side of the first notch to the first convex portion, and
   the distance from the second imaginary line to the end on the inner circumferential surface side of the second notch is longer than the distance from the end on the inner circumferential surface side of the second notch to the second convex portion.

* * * * *